US009003917B2

(12) United States Patent  
Geberth et al.

(10) Patent No.: US 9,003,917 B2  
(45) Date of Patent: Apr. 14, 2015

(54) ADJUSTABLE SHIFTER MECHANISM

(75) Inventors: Daniel Geberth, Odessa, FL (US); Robert Runman, New Port Richey, FL (US)

(73) Assignee: DG Auto Sales and Service LLC, Odessa, FL (US)

( * ) Notice: Subject to any disclaimer, the term of this patent is extended or adjusted under 35 U.S.C. 154(b) by 552 days.

(21) Appl. No.: 13/404,180

(22) Filed: Feb. 24, 2012

(65) Prior Publication Data

US 2013/0220051 A1 Aug. 29, 2013

(51) Int. Cl.
*F16H 59/04* (2006.01)
*F16H 59/02* (2006.01)

(52) U.S. Cl.
CPC .............. *F16H 59/04* (2013.01); *Y10T 74/2014* (2013.01); *B60Y 2304/07* (2013.01); *F16H 2059/026* (2013.01)

(58) Field of Classification Search
CPC .............................................. F16H 2059/0273
USPC ........................ 74/473.33, 525, 544, 546, 548
See application file for complete search history.

(56) References Cited

U.S. PATENT DOCUMENTS

| D211,209 S | 5/1968 | Hauser |
| D265,817 S | 8/1982 | Hahn |
| 4,474,085 A | 10/1984 | DeVogelaere et al. |
| D281,409 S | 11/1985 | Cambria |
| 4,581,951 A | 4/1986 | Watson |
| 4,693,135 A | 9/1987 | LaRocca et al. |
| 4,756,205 A | 7/1988 | Dickinson |
| 4,873,884 A | 10/1989 | Yamada et al. |
| 4,916,965 A * | 4/1990 | Wardenier et al. .......... 74/473.15 |
| 4,998,446 A | 3/1991 | Towne et al. |
| 5,085,096 A | 2/1992 | Behrens |
| 5,144,853 A | 9/1992 | Giudici |
| 5,287,743 A * | 2/1994 | Doolittle et al. .......... 74/471 XY |
| 5,419,214 A | 5/1995 | Buhl et al. |
| 5,489,246 A | 2/1996 | Moody et al. |
| 5,493,931 A | 2/1996 | Niskanen |
| D368,104 S | 3/1996 | Pfister et al. |

(Continued)

OTHER PUBLICATIONS

Registered User: SAMX. Numberic Racing Short Shifter Review. 6SpeedOnline. Jun. 5, 2012 [online], [retrieved on Nov. 6, 2013]. Retrieved from the Internet <URL: http://www.6speedonline.com/forums/996-turbo-gt2/277735-numeric-racing-short-shifterreview.html>.

(Continued)

*Primary Examiner* — William Kelleher
*Assistant Examiner* — Terence Boes
(74) *Attorney, Agent, or Firm* — Larson & Larson, P.A.; Frank Liebenow; Patrick Reid

(57) ABSTRACT

A gear shifter includes a frame and a pivot frame pivotally mounted to the frame. A gear shift lever is pivotally interfaced to the pivot frame by a pivot pin passing through a bore in the gear shift lever. The gear shift lever extends upwardly beyond the frame and a lower section of the gear shift lever extends downwardly into the frame. A fastener passes at least partially though the gear shift lever and interfaces with the pivot pin such that, one position of the fastener locks the pivot pin within the gear shift lever and within the pivot frame and, a second position of the fastener frees the pivot pin from both, therefore facilitating removal of the gear shift lever. The lower section of the gear shift lever is interfaced to a first transmission linkage and the pivot frame is interfaced to a second transmission linkage.

19 Claims, 7 Drawing Sheets

(56) References Cited

U.S. PATENT DOCUMENTS

| | | | |
|---|---|---|---|
| 5,505,103 | A | 4/1996 | Nordstrom et al. |
| 5,592,856 | A | 1/1997 | Parsons |
| 5,651,290 | A | 7/1997 | Osborn et al. |
| 5,727,424 | A * | 3/1998 | Brandewie et al. ........ 74/473.21 |
| 5,735,177 | A | 4/1998 | Crack |
| 5,758,543 | A * | 6/1998 | Bair ........................... 74/473.36 |
| 5,896,778 | A | 4/1999 | Murakami et al. |
| 6,196,079 | B1 | 3/2001 | Paparoni |
| 6,231,476 | B1 | 5/2001 | Reasoner et al. |
| 6,581,490 | B1 | 6/2003 | Graus |
| 7,000,497 | B1 * | 2/2006 | Campbell et al. ................ 74/525 |
| 7,464,621 | B2 * | 12/2008 | Mathis et al. ................ 74/473.3 |
| D594,796 | S | 6/2009 | Ballard et al. |
| D601,470 | S | 10/2009 | Griffin et al. |
| D601,472 | S | 10/2009 | Griffin et al. |
| 7,677,140 | B2 * | 3/2010 | Hull et al. .................... 81/177.2 |
| 7,854,181 | B2 * | 12/2010 | Ciamillo ........................ 74/525 |
| 7,900,534 | B2 | 3/2011 | Kusayama |
| 2003/0079564 | A1 * | 5/2003 | Thiengtham .................... 74/525 |
| 2003/0213326 | A1 | 11/2003 | Fett et al. |

OTHER PUBLICATIONS

Numeric Racing. Porsche GT3 Short Throw Shifter by Numeric Racing. Nov. 5, 2012 [online], [retrieved on Nov. 6, 2013]. v Retrieved from the Internet <URL: http://numericracing.wordpress.com/2012/11 /08/porsche-gt3-short-throw-shifter-by-numericracing/>.

* cited by examiner

ADJUSTABLE SHIFTER MECHANISM

FIELD

This invention relates to the automotive field and more particularly to a shift mechanism that is adjustable to meet the needs of multiple drivers of a vehicle.

BACKGROUND

Transmission shifters typically provide manual actuation for shifting a transmission between different gears. Each shifter normally includes a housing or frame mounted on, for example, a floor or steering column of a vehicle and an operating member movably mounted on the housing. The movable member translates movement of the driver's hands into mechanical changes that cause the transmission to shift between gears.

Many floor-mounted (console) shifters have an operating member (gear shift lever) with a handle at one end. The lower end of the operating member (gear shift lever) projects downwardly from a pivot point on the housing. The gear shift lever is typically moved in a pattern of shifting from $1^{st}$ gear, to $2^{nd}$ gear, to $3^{rd}$ gear, etc. In general, this shifting pattern is typically referred to as an "H" pattern with each point of the H representing a different gear, even though modern manual transmissions often have more than four gears. Some shifters have a straight line pattern (e.g., reverse gear is all the way back, first gear one step forward, etc.).

A resilient member (e.g. a spring) biases the operating member towards a neutral position. The operating member is moved forward/backward into individual shift positions and left/right through gates. For example, with one manufacturer of vehicles, moving the shifter forward engages first gear, but moving the shifter forward while pushing it to the right, through a "gate" engages third gear.

The shifter typically translates the forward/backward movement into operation of a first lever of the vehicles transmission and translates the left/right movement into operation of a second lever of the vehicles transmission. The levers of the transmission are typically operated through a linkage system that often includes cables within flexible housings (e.g. flexible rods).

Typically, a vehicle is provisioned with a fixed shifter that is designed for the typical driver and not adjustable to accommodate drivers that have differing physical features or desires. For example, even when custom-ordering a new vehicle, there is often no option for a different shifter. The only option that might even remotely resemble a different shifter is a different handle (e.g., some manufacturers have different styles of handles for different versions of a car). That being said, the seats are generally adjustable to move forward/back and, sometimes, up/down to accommodate drivers of varying stature. The seat adjustments are more for accommodating people of varying height and weight than for accommodating various arm lengths, body strength and personal desires. Furthermore, a fixed shifter does not accommodate for different, perhaps alternating, drivers of the same vehicle.

Additionally, some vehicles include motor-driven seat adjustments, steering wheel adjustments, and mirror adjustments. In such, there are often presets for individual drivers that share one vehicle. For example, pressing a driver-1 button moves the seats, mirrors, and steering wheel to a first settable position and pressing a driver-2 button moves the seats, mirrors, and steering wheel to a second settable position. Still, there is no adjustment for the shifter.

What is needed is an adjustable shifter that will adjust to the needs and desires of an individual driver.

SUMMARY

In one embodiment, a gear shifter is disclosed including a frame for attachment to a floor of a vehicle. A pivot frame is pivotally mounted to the frame such that the pivot frame pivots in a left and right rotational movement with respect to the frame. A gear shift lever is pivotally interfaced to the pivot frame by a pivot pin passing through a bore in the gear shift lever. The gear shift lever is pivotally mounted to the pivot frame such that the gear shift lever pivots in a forward and backward rotational movement with respect to the pivot frame. The gear shift lever extends upwardly beyond the frame for operation by a driver and a lower section of the gear shift lever extends downwardly into the frame. A fastener passes at least partially though the gear shift lever and interfaces with the pivot pin such that, one position of the fastener locks the pivot pin within the gear shift lever and within the pivot frame and, a second position of the fastener frees the pivot pin from the gear shift lever and the pivot frame, therefore facilitating removal and/or relocation of the gear shift lever. The lower section of the gear shift lever is interfaced to a first transmission linkage and the pivot frame is interfaced to a second transmission linkage.

In another embodiment, a gear shifter is disclosed including a frame that has a front end positioned toward a front of the vehicle and has a way to attach to a floor of the vehicle. A pivot frame is pivotally mounted to the frame such that the pivot frame pivots in a left and right rotational movement with respect to the frame. A gear shift lever is interfaced to the pivot frame such that the gear shift lever is removable from the pivot frame. The lower section of the gear shift lever is removably interfaced to a first transmission linkage and the pivot frame is interfaced to a second transmission linkage.

In another embodiment, a gear shifter is disclosed including a frame for attachment to a floor of a vehicle. The frame has a front end positioned toward a front of the vehicle. A pivot frame is pivotally mounted to the frame such that the pivot frame pivots/rotates in a left and right rotational movement with respect to the frame. A gear shift lever is pivotally interfaced to the pivot frame by a pivot pin passing through a bore in the gear shift lever. The gear shift lever is pivotally mounted to the pivot frame such that the gear shift lever pivots in a forward and backward rotational movement with respect to the pivot frame. The gear shift lever extends upwardly beyond the frame for operation by a driver and a lower section of the gear shift lever extends downwardly into the frame. A fastener passing at least partially though the gear shift lever interfaces with the pivot pin such that, one position of the fastener locks the pivot pin within the gear shift lever and within the pivot frame and, in a second position of the fastener frees the pivot pin from the gear shift lever and the pivot frame, therefore facilitating removal and/or relocation of the gear shift lever. A first adjustable linkage retainer is slideably interfaced to the frame and holds a stationary portion of a first transmission linkage and a second adjustable linkage retainer is slideably interfaced to the frame and holds a stationary portion of a second transmission linkage. The lower section of the gear shift lever is interfaced to a movable section of the first transmission linkage and the pivot frame is interfaced to a movable section of the second transmission linkage.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
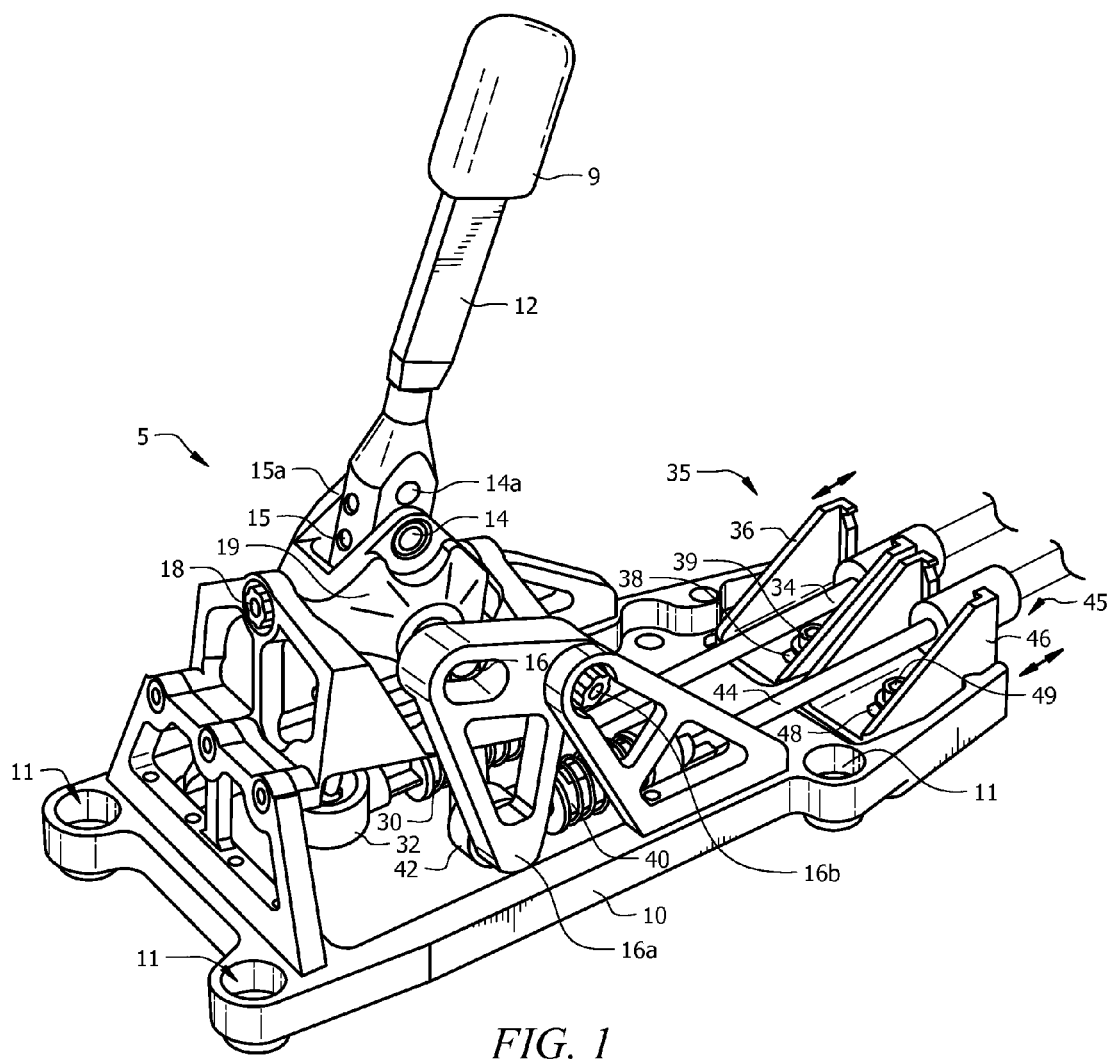
FIG. 1 illustrates a perspective view of a shifter.
Figure 2:
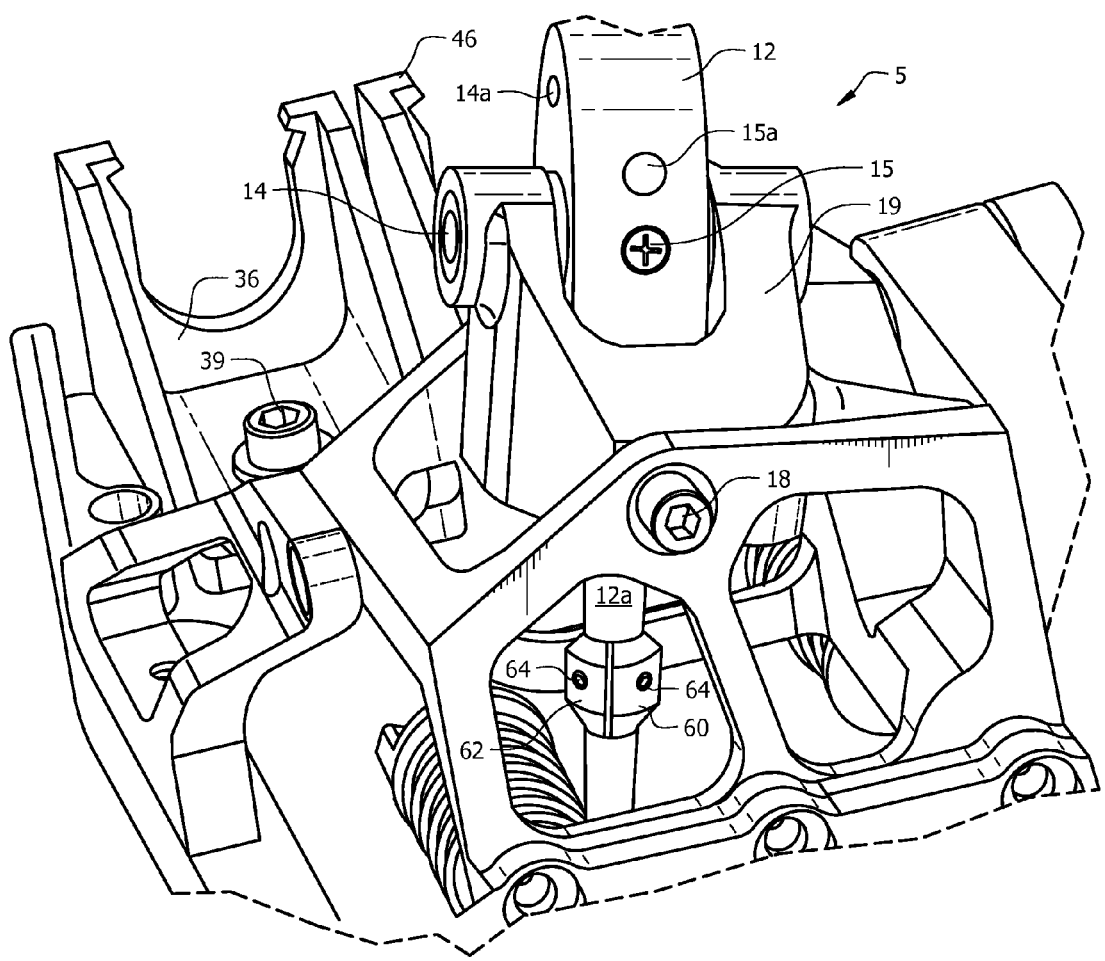
FIG. 2 illustrates a detailed perspective view of the shifter.
Figure 3:
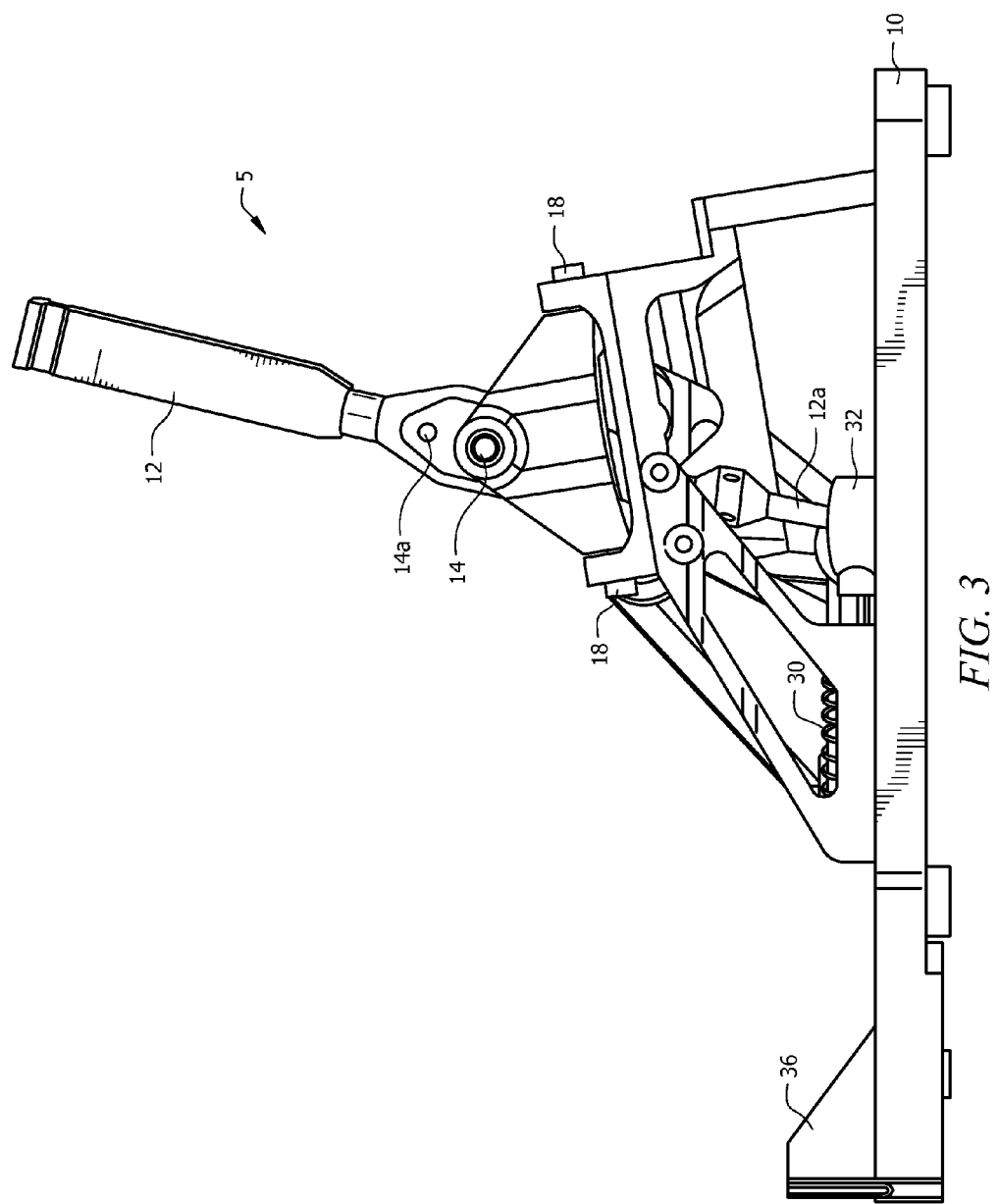
FIG. 3 illustrates a side plan view of the shifter.
Figure 4:
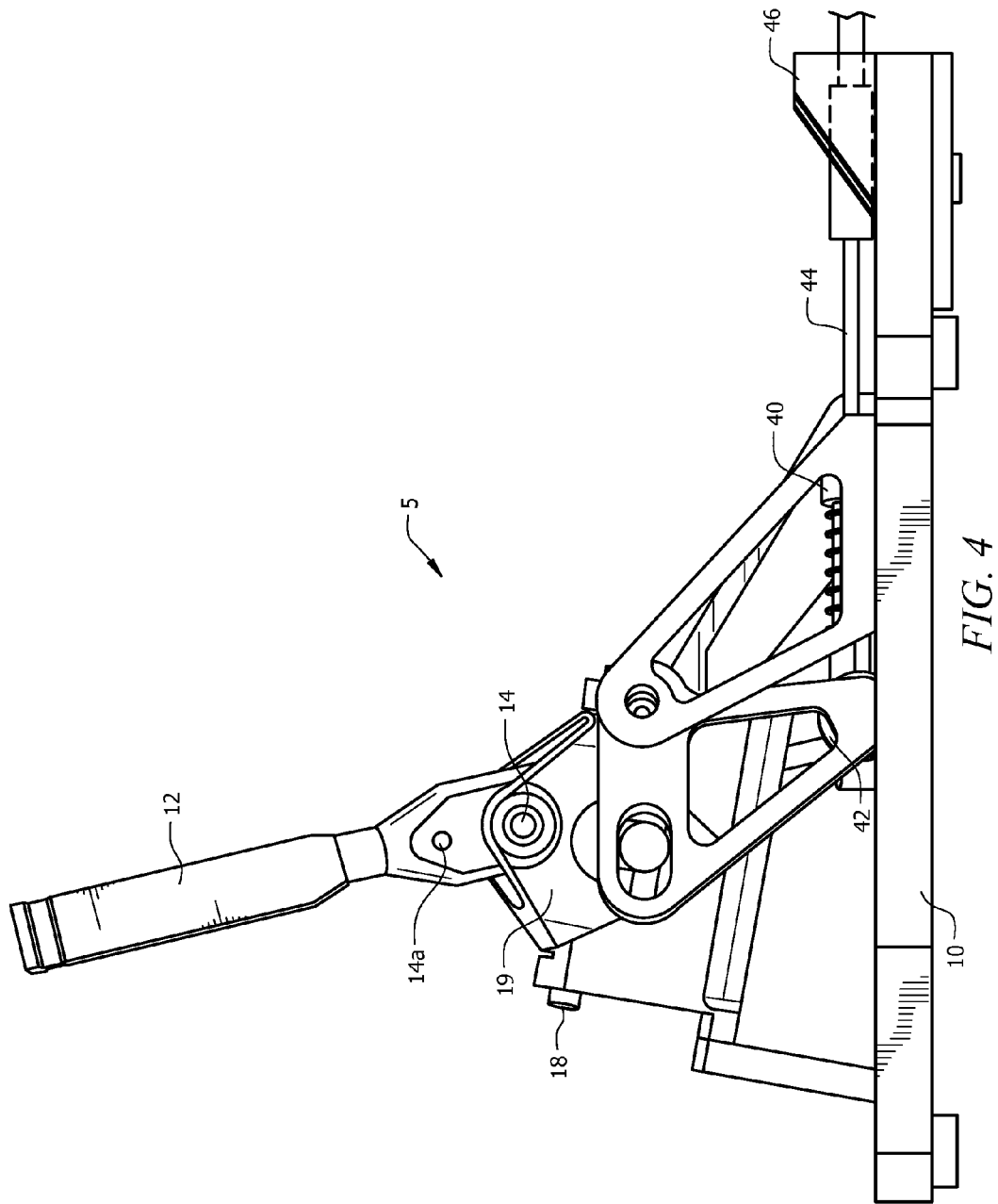
FIG. 4 illustrates a side plan view of the shifter with transmission linkage attached.
Figure 5:
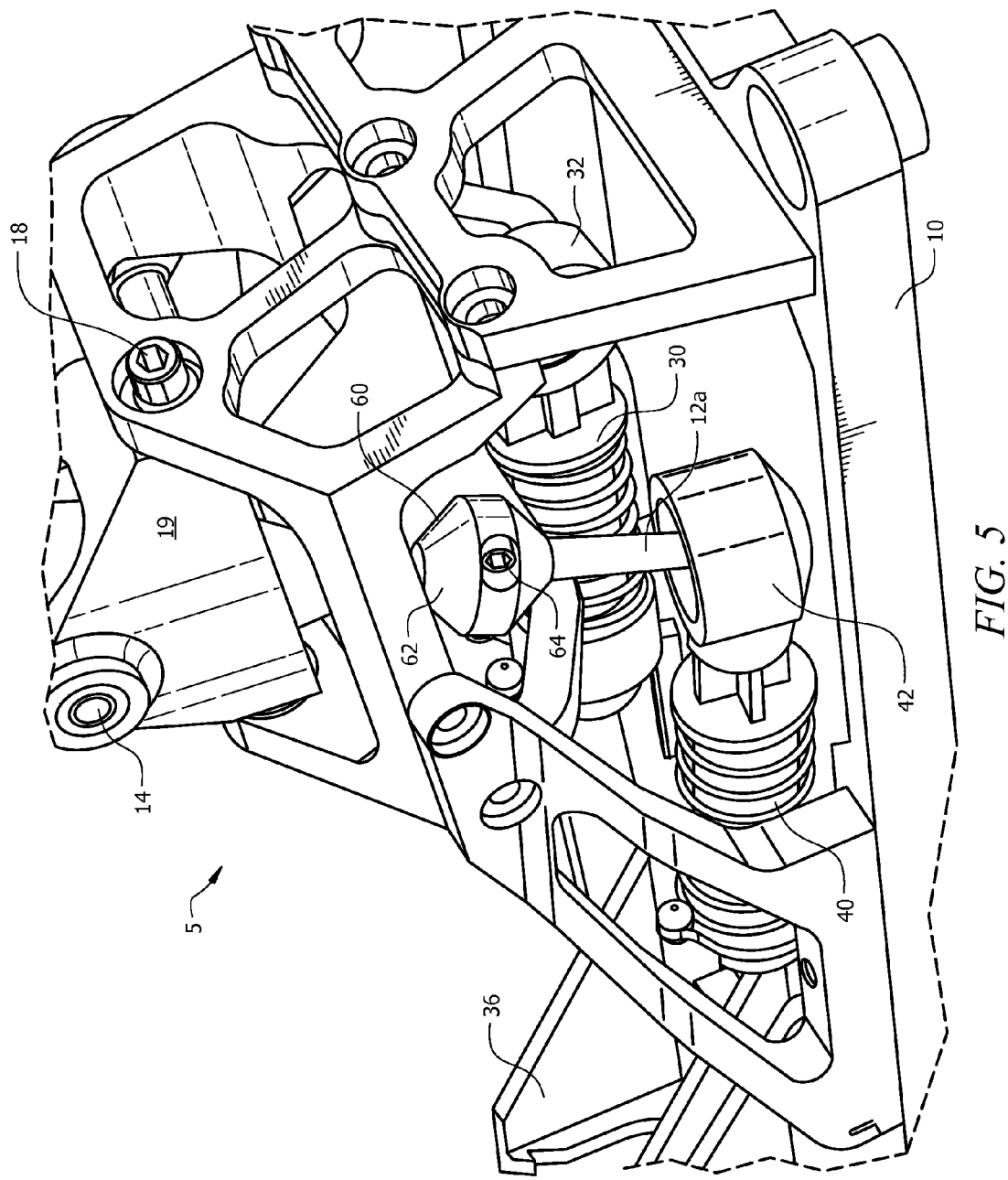
FIG. 5 illustrates a detail perspective view of the shifter showing the adjustable counter weight.

Reference will now be made in detail to the presently preferred embodiments of the invention, examples of which are illustrated in the accompanying drawings. Throughout the following detailed description, the same reference numerals refer to the same elements in all figures.

Although shown having a specific style of frame, there is no limitation on the style, structure, size or dimensions of the frame and other components of the disclosed shifter.

Referring to FIGS. 1 through 5, views of a gear shifter 5 are shown. The gear shifter 5 includes a rigid gear shift frame 10 that has a plurality of mounting holes 11 that typically match hole patterns of a target vehicle (not shown for clarity reasons). As shown, the mounting holes 11 have recesses, but there is no requirement for such recesses. The gear shift frame 10 typically mounts to the floor of a vehicle (to the right of the driver's seat for left-seat driven vehicles), using fasteners (not shown) that secure the gear shift frame 10 to the floor of the vehicle. In some embodiments, the mounting holes 11 are longitudinal slots and the entire gear shifter frame 10 is relocatable forward/backward to further provide adjustment of the position of the gear shifter lever 12/handle 9.

The gear shifter 5 has a gear shift lever 12 that interfaces to the gear shift frame 10 by a pivot system that allows the gear shift lever 12 to rotate, typically in an arc forward/backward and left/right, about the pivot system. The gear shifter 5 shown has both a forward/backward rotational interface (pivot) 14 and a left/right rotational interface (pivot) 18, though in some gear shifters 5, it is anticipated that only one pivot 14/18 is present (e.g. for straight line shifters—not shown). Front/back pivoting motion is enabled by the gear shift pivot 14 such that, when the shift handle 9 is pushed forward, the gear shift lever—lower shaft 12a moves backward and when the shift handle 9 is pulled backwards, the gear shift lever—lower shaft 12a moves forward.

Left/right pivoting motion is enabled by the sideways pivot 18 such that, when the shift handle 9 is pushed towards the left, the sideways pivoting frame 19 pivots around the sideways pivot 18 and the gear shift lever—lower shaft 12a moves towards the right; and when the shift handle 9 is pushed towards the right, the sideways pivoting frame 19 pivots around the sideways pivot 18 and the gear shift lever—lower shaft 12a moves towards the left.

To accommodate driver changes in which the drivers are of different physique and/or have different desires, the gear shift lever 12 is easily and quickly separated by removal of the pivot pin 14. This is accomplished by loosening or removing one or more fasteners 15 (e.g. set screws, bolts or pins) that retain the pivot pin 14 within the gear shift lever 12 and the pivot frame 19. Once the fastener 15 is loosened or removed, the pivot shaft 14 is pulled or pushed out and the gear shift lever 12 is removed. Note that the pivot shaft is currently in a bore that passes through the gear shift lever 12 (not visible) and there is a second bore 14a. Likewise, there is a second position/threaded bore 15a for the fastener 15. In this embodiment, the same gear shift lever 12 is installed with the pivot shaft 14 running through the second bore 14a and the fastener 15 is moved to the second position/threaded bore 15a and tightened, thereby retaining the pivot shaft 14 in the second bore 14a. This provides a different amount of leverage, either providing shorter travel between gear positions or greater travel between gear positions. Due to physics, greater strength is needed when travel is lesser and lesser strength is needed when travel is greater. Any number of bores 14a and/or fasteners 15 and/or fastener threaded bores 15a is anticipated.

In a similar fashion, a second, different, gear shift lever 12 is installed by passing the pivot shaft 14 through either bore in the gear shift lever 12. The fastener 15 is then replaced and/or tightened to hold the second gear shift lever 12 in place. In such, it is anticipated that there are multiple (at least two) sizes/shapes of gear shift levers 12, satisfying a range of physiques and desires.

To provide a certain "feel" to the shift action, a counterweight 60/62/64 is removably affixed to the gear shift lever—lower shaft 12a. As the counterweight 60/62/64 is made heavier and/or moved farther from the gear shift pivot 14, increased force is required to move the shift handle. As the counterweight 60/62/64 is made lighter and/or moved closer to the gear shift pivot 14, less force is required to move the shift handle. To accommodate variations of abilities and desires of individual drivers, the counterweight 60/62/64 is interchangeable (e.g., counterweights 60/62/64 having different masses are anticipated) and movable along the gear shift lever—lower shaft 12a. Therefore, a heavy counterweight 60/62/64 positioned furthest away from the gear shift pivot 14 is anticipated for a driver that desires more resistance and either no counterweight 60/62/64 or a light-weight counterweight 60/62/64 positioned closeest to the gear shift pivot 14 is anticipated for a driver that desires less resistance. Although many forms of interchangeable and positionable counterweights 60/62/64 are anticipated, the example shown (e.g. FIG. 2) includes two half weights 60/62 held together and compressed against the gear shift lever—lower shaft 12a by one or more fasteners 64. It is anticipated that the counterweight 60/62/64 be made of a dense material including, but not limited to, steel, iron, lead, copper. In some embodiments, the material (e.g. steel, iron, lead, copper, etc.) is enclosed in a shell (e.g. a plastic shell).

The motion of the sideways pivoting frame 19 and the gear shift lever—lower shaft 12a is translated into displacement required by the vehicle's transmission to enact changing of the gears. With regard to forward/backward motion of the gear shift lever 12, the gear shift lever—lower shaft 12a is coupled to the transmission by front/back linkage 34. In the example shown, the gear shift lever—lower shaft 12a is coupled to the front/back linkage 34 by a front/back linkage connector 30, though any type of linkage connection is anticipated. The front/back linkage connector 30 shown with a typical cup-shaped linkage interface 32 for capturing a spherical end of the gear shift lever—lower shaft 12a. Forward/backward motion of the gear shift lever—lower shaft 12a displaces the front/back linkage connector 30 in a forward/backward direction and, hence, displaces (pushes or pulls) the front/back linkage 34. A distal end of the front/back linkage 34 is interfaced to a lever on the transmission (not shown) for facilitating the shifting of gears within the transmission.

With regard to left/right motion of the gear shift lever 12, the gear shift lever 12 is coupled to the sideways pivoting frame 19. As the sideways pivoting frame 19 pivots about the sideways pivot 18, the sub-frame 16a is lifted or lowered by the side link 16. Since the sub-frame 16a is pivotally interfaced to the frame by another pivot 16b, the bottom of the sub-frame 16a moves forward as the gear shift lever is pushed towards the right and the bottom of the sub-frame 16a moves backwards as the gear shift lever is pushed towards the left. The sub-frame 16a is coupled to the right/left linkage 44 by a right/left linkage connector 40, though any type of linkage connection is anticipated. The right/left linkage connector 40 shown has a typical cup-shaped linkage connector 42 that is connected for capturing the spherical or cylindrical left/right linkage connector (not shown), though any type of connection is anticipated. Right/left motion of the gear shift lever 12 moves the right/left linkage interface 40/42 forward and backward with respect to the gear shift frame 10 and, hence, displaces (pushes or pulls) the right/left linkage 44. A distal end of the right/left linkage 44 is interfaced to a second lever on the transmission (not shown) for facilitating shifting gears within the transmission. Although one form of linkage connection is shown in the drawings, there are many forms of linkage connections known in the industry, all of which are anticipated and included here within.

The linkages 34/44 are typically flexible rods that have linkages stops 35/45. The linkage stops 35/45 are held by linkage retainers 36/46. The position of each linkage retainer 36/46 determines the angle of the gear shift lever 12 that will actuate each gear. For example, positioning the front/back linkage retainer 36 forward with respect to the gear shift frame 10 moves the shift pattern backward (closer to the driver) while positioning the front/back linkage retainer 36 backward with respect to the gear shift frame 10 moves the shift pattern forward (farther from the driver). Likewise, positioning the right/left linkage retainer 46 forward with respect to the gear shift frame 10 moves the shift pattern to the right (farther from the driver) while positioning the right/left linkage retainer 46 backward with respect to the gear shift frame 10 moves the shift pattern to the left (closer to the driver).

The position of each of the linkage retainers 36/46 is adjustable (forward/backward). As shown in the example of FIG. 1, each of the linkage retainers 36/46 has an adjustment slot 38/48 and an adjustment fastener 39/49. The adjustment fastener 39/49 holds the linkage retainers 36/46 to the gear shift frame 10. To adjust one of the linkage retainers 36/46, the linkage adjustment fastener 39/49 is loosened; the linkage retainer 36/46 is moved along the adjustment slot 38/48 to the desired location; and then the linkage adjustment fastener 39/49 is retightened. The example shown is one example of providing adjustable linkage retainers 36/46 and any other mechanism similar to such is anticipated including the mechanisms shown in FIGS. 6 and 7.

The gear shift lever 12 is easily replaceable through the use of a quick release fastener(s) 15. In such, after loosening and/or removal of the fasteners 15 and removal of the gear shift pivot 14, the gear shift lever 12 is easily pulled out of the front/back linkage interface 32 and the gear shift lever 12 is free for removal. It is anticipated that a variety of gear shift levers 12 is available in different weights, styles and lengths. The variety of gear shift levers 12 will provide for differences between drivers, both physical differences as well as desires. For example, a shift lever 12 that is longer above the pivot 14 will typically require greater travel of the shift handle 9 while a gear shift lever 12 that is longer below the pivot 14 will require less travel and vice versa.

Figure 6:
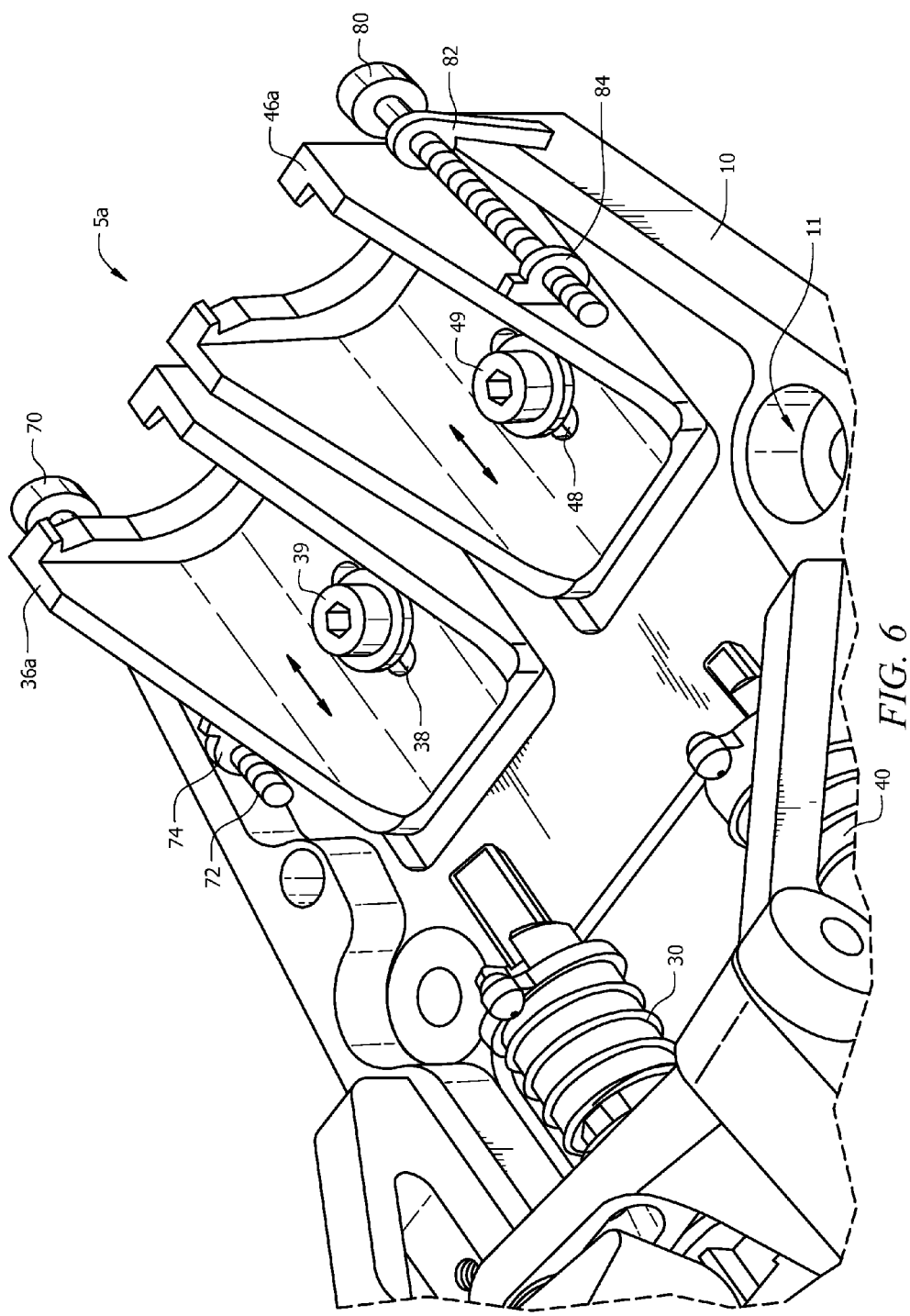
FIG. 6 illustrates a detail perspective view of the shifter showing the adjustable transmission linkage retainers.

Referring to FIG. 6, a detail perspective view of the gear shifter 5a showing manually adjustable transmission linkage retainers 36a/46a is shown. In this embodiment, the linkage retainers 36a/46a are slideably interfaced to the frame 10 such that either or both linkage retainers 36a/46a are free to move forward (towards the gear shift lever 12) or backwards (away from the gear shift lever 12). There are many known ways to interface two objects together in a slideable fashion; the example shown in FIG. 6 is one example of such. In this example, the fasteners 39/49 are not completely tightened or are tightened but restricted from preventing movement of the linkage retainers 36a/46a (e.g. shoulder bolts, etc.), thereby the linkage retainers 36a/46a are allowed to move forward/backward, limited by the dimensions of the adjustment slots 38/48. In such, it is anticipated that the fasteners 39/49 lock by devices and materials known in the industry (e.g. stop nuts). That being said, it is not desirable for the linkage retainers 36a/46a to move freely. Therefore, a mechanical adjustment mechanism 70/72/74 holds the linkage retainer 36a and a second mechanical adjustment mechanism 80/82/84 holds the linkage retainer 46a in place, each providing for adjustment of the linkage retainers 36a/46a. The adjustment mechanisms 70/72/74/80/82/84 move the linkage retainers 36a/46a forward/backward through the full range of the adjustment slots 38/48. This is to say, that the position of the fasteners 39/49 is adjustable from one end of the adjustment slots 38/48 to a distal opposing end of the adjustment slots 38/48.

In the example shown, each screw 70/80 is rotatably interfaced to the frame 10 by non-threaded retainer brackets 72/82. The brackets 72/82 permit rotation of the screws 70/80 (or any threaded device) while maintaining a position of the screws 70/80 with respect to the frame 10 and the non-threaded retainer brackets 72/82 (e.g., the screw 80 is captured). The screws 70/80 interface with their respective linkage retainers 36a/46a by a threaded interface 74/84 such that, as the screws 70/80 are turned, the threads of the screws 70/80 and the threads of the threaded interface 74/84 mesh and the threaded interface 74/84 moves up or down the threads of the screws 70/80, moving the respective linkage retainers 36a/46a in the same direction. This movement changes the relative location of the shift lever 12 either forward/backward by way of the first linkage retainer 36a and associated mechanism 70/72/74 and/or left/right by way of the second linkage retainer 46a and associated mechanism 80/82/84.

Figure 7:
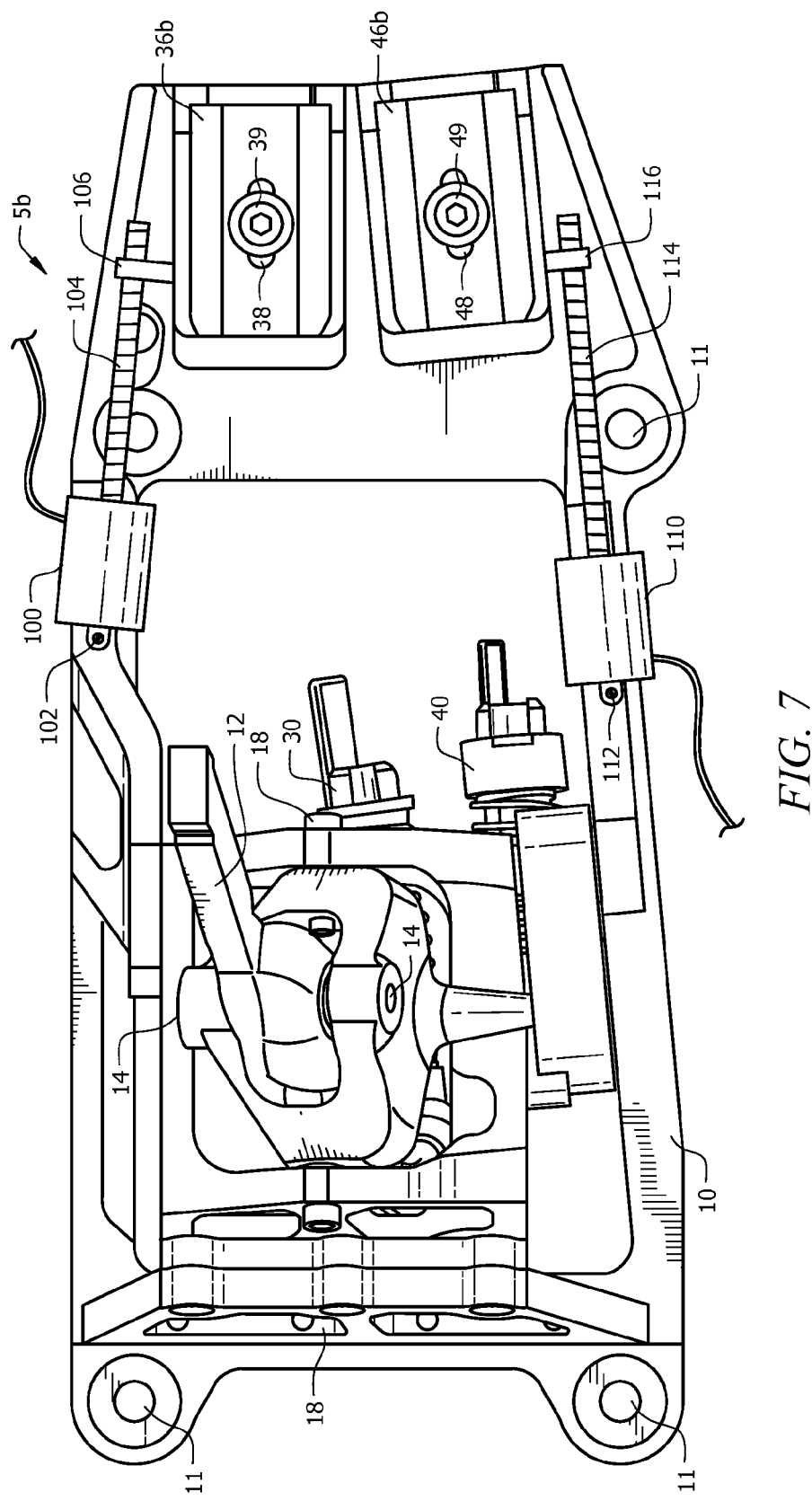
FIG. 7 illustrates a detail perspective view of the shifter showing motorized, adjustable transmission linkage retainers.

Referring to FIG. 7, a detailed perspective view of the gear shifter 5b showing motorized, adjustable transmission linkage retainers 36b/46b is shown. In this embodiment, the linkage retainers 36b/46b are slideably interfaced to the frame 10 such that either or both linkage retainers 36b/46b are free to move forward (towards the gear shift lever 12) or backwards (away from the gear shift lever 12). As previously stated, there are many known ways to interface two objects together in a slideable fashion; the example shown in FIG. 7 is one example of such. In this example, the fasteners 39/49 are not completely tightened, thereby the linkage retainers 36b/46b allowed to move forward/backward, limited by the dimensions of the adjustment slots 38/48 (as previously described). That being said, it is not desirable for the linkage retainers 36b/46b to move freely during use of the shifter 5b. Therefore, a motorized adjustment mechanism 100/102/104/106 holds the linkage retainer 36b and a second motorized adjustment mechanism 110/112/114/116 holds the linkage retainer 46b in place, each providing for adjustment of the linkage retainers 36b/46b. The motorized adjustment mechanisms 100/102/104/106/110/112/114/116 move the linkage retainers 36b/46b forward/backward through the full range of the adjustment slots 38/48. This is to say, the position of the fasteners 39/49 is adjustable from one end of the adjustment slots 38/48 to a distal opposing end of the adjustment slots 38/48.

In the example shown, each screw linkage retainer 36*b*/46*b* has an associated motor 100/110 and each of the motors 100/110 is anchored to the frame 10 by fasteners 102/112. Each of the motors 100/110 drive a threaded shaft 104/114 (or any threaded device) The threaded shafts 104/114 interface with their respective linkage retainers 36*b*/46*b* by a threaded interface 106/116 such that, as the threaded shafts 104/114 turn, the threads of the threaded shafts 104/114 and the threads of the threaded interfaces 104/114 mesh and the threaded interface 106/116 moves up or down the threads of the threaded shafts 104/114, moving the respective linkage retainers 36*b*/46*b* in the same direction as the threaded interface 106/116. This movement changes the relative location of the shift lever 12 either forward/backward by way of the first linkage retainer 36*b* and associated mechanism 100/102/104/106 and/or left/right by way of the second linkage retainer 46*b* and associated mechanism 110/112/114/116.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A gear shifter comprising:
   a frame, the frame configured for attachment to a vehicle, the frame having a front end positioned toward a front of the vehicle;
   a pivot frame rotatably interfaced to the frame;
   a gear shift lever pivotally interfaced to the pivot frame at a rotational interface;
   a first linkage connected to the gear shift lever; and
   a second linkage connected to the pivot frame;
   whereas the gear shift lever is removable at the rotational interface by actuation by a single fastener; and
   the first linkage is a first flexible rod having a movable section and a stationary section, a first end of the movable section of the first flexible rod is interfaced to the lower section of the gear shift lever and a distal second end of the movable section of the first flexible rod is interfaced to a first actuator lever of a transmission and the stationary section of the first transmission linkage is interfaced to the frame by means for adjustably interfacing the frame to the first flexible rod; and
   the second linkage is a second flexible rod having a movable section and a stationary section, a first end of the movable section of the second flexible rod is interfaced to the pivot frame and a distal second end of the movable section of the second flexible rod is interfaced to a second actuator lever of a transmission and the stationary section of the second transmission linkage is interfaced to the frame by means for adjustably interfacing the frame to the second flexible rod.

2. The gear shifter of claim 1, wherein the gear shift lever has a plurality of bores and a plurality of corresponding fastener locations, and the distance of travel of the gear shift lever is adjustable by moving the rotational interface to a selected bore of the plurality of bores and locking the rotational interface by moving the fastener to a selected corresponding fastener location that corresponds to the selected bore.

3. The gear shifter of claim 1, further comprising a counter weight affixed to a lower section of the gear shift lever.

4. The gear shifter of claim 3, wherein the counter weight is relocatable to different locations along the lower section of the gear shift lever.

5. The gear shifter of claim 3, wherein the counter weight is removable from the lower section the gear shift lever.

6. The gear shifter of claim 5, further comprising a second counterweight having a different mass than the first counter weight and the second counter weight is installed on the lower section of the gear shift lever.

7. The gear shifter of claim 1, wherein said first transmission linkage includes a first flexible rod, a first end of a movable section of the first flexible rod is interfaced to the lower section of the gear shift lever, a distal end of the movable section of the first flexible rod is interfaced to a first actuator lever of a transmission and a stationary section of the first flexible rod is held by a first linkage retainer, whereas the first linkage retainer is adjustably interfaced to the frame, allowing relocation of the first linkage retainer to a different position in either a forward or backward location.

8. The gear shifter of claim 1, wherein the second transmission linkage includes a second flexible rod, a first end of a movable section of the second flexible rod is interfaced to the pivot frame, a distal end of the movable section of the second flexible rod is interfaced to a second actuator lever of a transmission and a stationary section of the second flexible rod is held by a second linkage retainer, whereas the second linkage retainer is adjustably interfaced to the frame, allowing relocation of the second linkage retainer to a different position in either a forward or backward location.

9. A gear shifter comprising:
   a frame;
   means for attaching the frame to a vehicle;
   a pivot frame, the pivot frame pivotally mounted to the frame such that the pivot frame pivots in a left and right rotational movement with respect to the frame;
   a gear shift lever pivotally interfaced to the pivot frame by a pivot pin, the pivot pin held within the gear shift lever and within the pivot frame by a fastener such that disengagement of the fastener enables removal of the pivot pin and, hence quick removal of the gear shift lever;
   whereas a lower section of the gear shift lever is removably interfaced to a first transmission linkage and the pivot frame is interfaced to a second transmission linkage;
   the first transmission linkage is a first flexible rod having a movable section and a stationary section, a first end of the movable section of the first flexible rod is interfaced to a lower section of the gear shift lever and a distal second end of the movable section of the first flexible rod is interfaced to a first actuator lever of a transmission and the stationary section of the first transmission linkage is interfaced to the frame by means for adjustably interfacing the frame to the first flexible rod; and
   the second transmission linkage is a second flexible rod having a movable section and a stationary section, a first end of the movable section of the second flexible rod is interfaced to the pivot frame and a distal second end of the movable section of the second flexible rod is interfaced to a second actuator lever of the transmission and the stationary section of the second transmission linkage is interfaced to the frame by means for adjustably interfacing the frame to the second flexible rod.

10. The gear shifter of claim 9, wherein the gear shift lever includes a plurality of bores in the gear shift lever and a plurality of corresponding fastener locations corresponding to each of the plurality of bores.

11. The gear shifter of claim 9, further comprising means for changing the weight balance of the gear shift lever.

12. The gear shifter of claim 11, wherein the means for changing the weight balance of the gear shift lever is a counter weight and the counter weight is relocatable along the lower section of the gear shift lever.

13. The gear shifter of claim 11, wherein the means for changing the weight balance of the gear shift lever is a counter weight and the counter weight is removable from the gear shift lever.

14. The gear shifter of claim 9, wherein the means for adjustably interfacing the frame to the first flexible rod is manually adjusted by turning of a first threaded shaft and the means for adjustably interfacing the frame to the second flexible rod is manually adjusted by turning a second threaded shaft.

15. The gear shifter of claim 9, wherein the means for adjustably interfacing the frame to the first flexible rod is adjusted by turning of a first threaded shaft by a first motor and means for adjustably interfacing the frame to the second flexible rod is manually adjusted by turning a second threaded shaft by a second motor.

16. A gear shifter comprising:
a frame, the frame configured for attachment to a floor of a vehicle, the frame having a front end positioned toward a front of the vehicle;
a pivot frame, the pivot frame pivotally mounted to the frame such that the pivot frame pivots in a left and right rotational movement with respect to the frame;
a gear shift lever pivotally interfaced to the pivot frame by a pivot pin passing through a bore in the gear shift lever, the gear shift lever pivotally mounted to the pivot frame such that the gear shift lever pivots in a forward and backward rotational movement on the pivot pin;
a fastener passing at least partially though the gear shift lever and interfacing with the pivot pin such that, one position of the fastener locks the pivot pin within the gear shift lever and within the pivot frame and, such that, a second position of the fastener frees the pivot pin from the gear shift lever and the pivot frame, therefore facilitating removal and/or relocation of the gear shift lever;
a first adjustable linkage retainer slideably interfaced to the frame and holding a stationary portion of a first transmission linkage; and
a second adjustable linkage retainer slideably interfaced to the frame and holding a stationary portion of a second transmission linkage;
whereas a lower section of the gear shift lever is interfaced to a movable section of the first transmission linkage and the pivot frame is interfaced to a movable section of the second transmission linkage.

17. The gear shifter of claim 16, further comprising a counter weight, the counterweight is removable and the counterweight is relocatable to different locations along the lower section of the gear shift lever.

18. The gear shifter of claim 16, wherein the first adjustable linkage retainer is manually adjusted by turning of a first threaded shaft interfaced between the frame and the first adjustable linkage retainer, and the second adjustable linkage retainer is manually adjusted by turning a second threaded shaft interfaced between the frame and the second adjustable linkage retainer.

19. The gear shifter of claim 16, wherein the first adjustable linkage retainer is adjusted by turning of a first threaded shaft by a first motor, the first motor affixed to the frame and the first threaded shaft interfaced to the first adjustable linkage retainer and the second adjustable linkage retainer is adjusted by turning of a second threaded shaft by a second motor, the second motor affixed to the frame and the second threaded shaft interfaced to the second adjustable linkage retainer.

* * * * *